United States Patent
Szegedy et al.

(10) Patent No.: US 11,416,745 B1
(45) Date of Patent: *Aug. 16, 2022

(54) ADVERSARIAL TRAINING OF NEURAL NETWORKS

(71) Applicant: Google LLC, Mountain View, CA (US)

(72) Inventors: Christian Szegedy, Mountain View, CA (US); Ian Goodfellow, Mountain View, CA (US)

(73) Assignee: Google LLC, Mountain View, CA (US)

( * ) Notice: Subject to any disclaimer, the term of this patent is extended or adjusted under 35 U.S.C. 154(b) by 367 days.

This patent is subject to a terminal disclaimer.

(21) Appl. No.: 16/692,257

(22) Filed: Nov. 22, 2019

Related U.S. Application Data

(63) Continuation of application No. 15/279,268, filed on Sep. 28, 2016, now Pat. No. 10,521,718.

(60) Provisional application No. 62/233,968, filed on Sep. 28, 2015.

(51) Int. Cl.
*G06N 3/08* (2006.01)
*G06N 20/00* (2019.01)

(52) U.S. Cl.
CPC .............. *G06N 3/08* (2013.01); *G06N 20/00* (2019.01)

(58) Field of Classification Search
CPC ................................. G06N 3/08; G06N 20/00
See application file for complete search history.

(56) References Cited

U.S. PATENT DOCUMENTS

| | | | |
|---|---|---|---|
| 5,651,098 A * | 7/1997 | Inoue | G06Q 10/04 706/13 |
| 2006/0095888 A1* | 5/2006 | Li | G06F 30/367 716/132 |
| 2009/0006292 A1* | 1/2009 | Block | G06K 9/00409 706/20 |
| 2015/0134578 A1* | 5/2015 | Tamatsu | G06N 3/0454 706/12 |

OTHER PUBLICATIONS

Goodfellow, Ian, et al. "Generative adversarial nets." Advances in neural information processing systems 27 (2014). (Year: 2014).*

(Continued)

*Primary Examiner* — Li B. Zhen
*Assistant Examiner* — Henry Nguyen
(74) *Attorney, Agent, or Firm* — Fish & Richardson P.C.

(57) ABSTRACT

Methods, systems, and apparatus, including computer programs encoded on computer storage media, for adversarial training of a neural network. One of the methods includes obtaining a plurality of training inputs; and training the neural network on each of the training inputs, comprising, for each of the training inputs: processing the training input using the neural network to determine a neural network output for the training input; applying a perturbation to the training input to generate an adversarial perturbation of the training input; processing the adversarial perturbation of the training input using the neural network to determine a neural network output for the adversarial perturbation; and adjusting the current values of the parameters of the neural network by performing an iteration of a neural network training procedure to optimize an adversarial objective function.

18 Claims, 3 Drawing Sheets

(56) References Cited

OTHER PUBLICATIONS

Goodfellow et al. "Explaining and harnessing adversarial examples," arXiv preprint arXiv, 2014, 1412.6572, 11 pages.
Goodfellow et al., Generative Adversarial Nets, 2014, Universite de Montreal, Edition 1, pp. 1-9.
Gu et al. "Towards Deep Neural Network Architectures Robust to Adversarial Examples," arXiv preprint arXiv, 2014, 1412.5068, 9 pages.
Gutmann et al., Noise-contrastive estimation: A new estimation principle for unnornnalized statistical models, 2011, University of Helsinki.
Mirza et al., Conditional Generative Adversarial Nets, Nov. 6, 2014, Universite de Montreal, pp. 1-7.
Srivastava. "Improving Neural Networks with Dropout," Doctoral dissertation, University of Toronto, 2013, 26 pages.
Szegedy et al. "Intriguing properties of neural networks," arXiv preprint arXiv, 2013, 1312.6199, 10 pages.

\* cited by examiner

ADVERSARIAL TRAINING OF NEURAL NETWORKS

CROSS-REFERENCE TO RELATED APPLICATION

This application is a continuation of and claims priority to U.S. application Ser. No. 15/279,268, filed on Sep. 28, 2016, which claims priority to U.S. Provisional Application No. 62/233,968, filed on Sep. 28, 2015. The disclosure of the prior application is considered part of and is incorporated by reference in the disclosure of this application.

BACKGROUND

This specification relates to training neural networks.

Neural networks are machine learning models that employ one or more layers of models to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

SUMMARY

In general, one innovative aspect of the subject matter described in this specification can be embodied in methods that include the actions of obtaining training inputs for training a neural network and, for each of the training inputs, a respective target output for the training input and training the neural network on each of the training inputs. Training the neural network on a given training input includes: processing the training input using the neural network to determine a neural network output for the training input in accordance with current values of the parameters of the neural network; applying a perturbation to the training input to generate an adversarial perturbation of the training input; processing the adversarial perturbation of the training input using the neural network to determine a neural network output for the adversarial perturbation of the training input in accordance with the current values of the parameters of the neural network; and adjusting the current values of the parameters of the neural network by performing an iteration of a neural network training procedure to optimize an adversarial objective function, wherein the adversarial objective function is a combination of: (i) a specified objective function taking as input the neural network output for the training input and the target output for the training input; and (ii) the specified objective function taking as input the neural network output for the adversarial perturbation of the training input and the target output for the training input.

Other implementations of this and other aspects include corresponding systems, apparatus, and computer programs, configured to perform the actions of the methods, encoded on computer storage devices. A system of one or more computers can be so configured by virtue of software, firmware, hardware, or a combination of them installed on the system that in operation cause the system to perform the actions. One or more computer programs can be so configured by virtue of having instructions that, when executed by data processing apparatus, cause the apparatus to perform the actions.

Particular embodiments of the subject matter described in this specification can be implemented so as to realize one or more of the following advantages. By training a neural network on both original training inputs and adversarial perturbations of the original training inputs, the performance of the neural network when trained can be improved. Additionally, by training the neural network as described in this specification, the trained neural network becomes more resistant to adversarial examples formed by applying small perturbations to examples from a test dataset. That is, the accuracy of predictions generated by the neural network for the adversarial examples and on the data set overall is improved. Additionally, by training the neural network as described in this specification, the trained neural network can better generalize to new inputs having characteristics different from those of inputs in the training data for the neural network. Additionally, by training the neural network as described in this specification, a larger neural network can be trained to achieve improved performance without overfitting to the training inputs in the training data.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
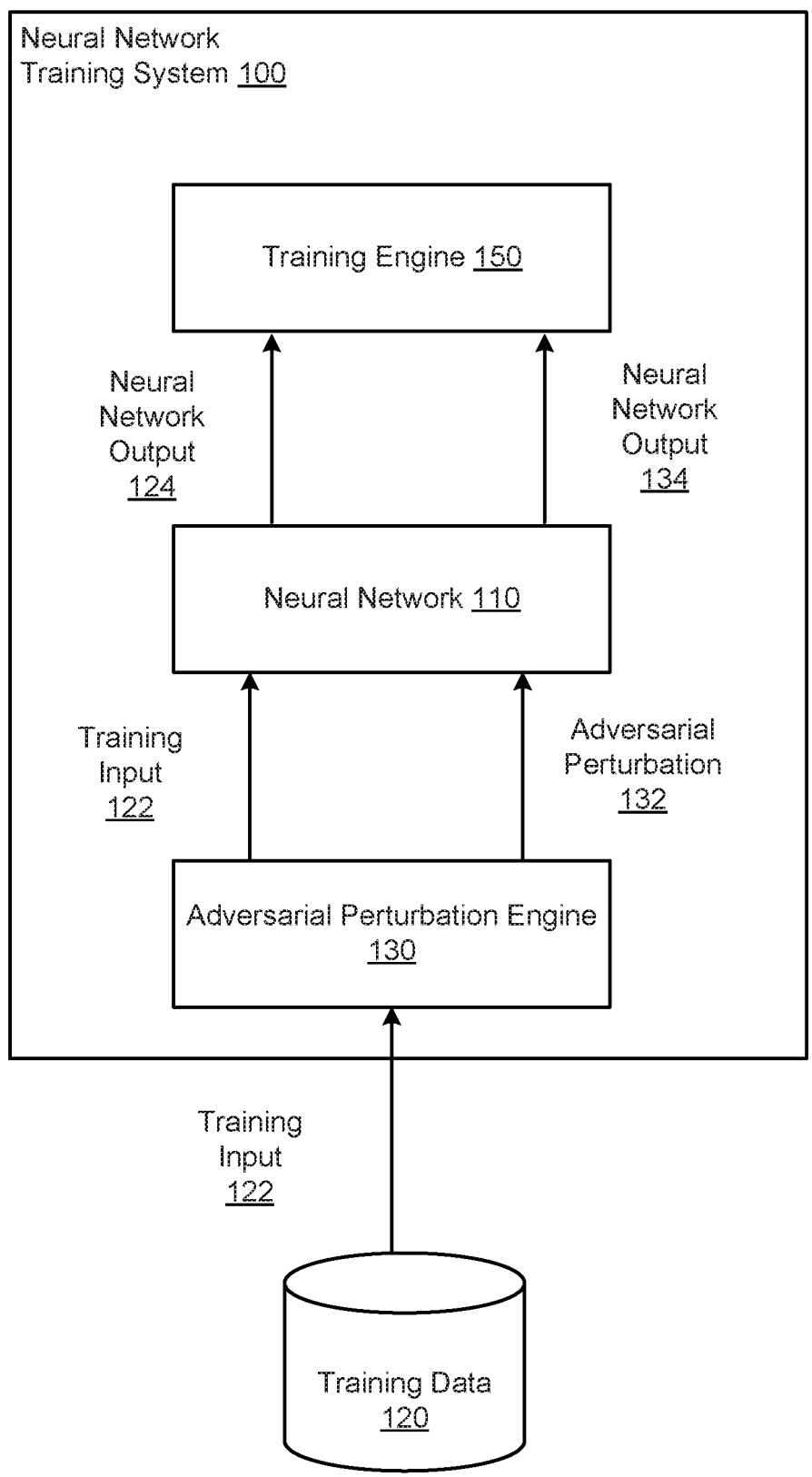
FIG. 1 shows an example neural network training system.

FIG. 1 shows an example neural network training system 100. The neural network training system 100 is an example of a system implemented as computer programs on one or more computers in one or more locations, in which the systems, components, and techniques described below can be implemented.

The neural network training system 100 trains a neural network 110 on training inputs from a training data repository 120 to determine trained values of the parameters of the neural network 110 from initial values of the parameters. The neural network 110 can be a feedforward deep neural network, e.g., a convolutional neural network, or a recurrent neural network, e.g., a long short term (LSTM) neural network.

The neural network 110 can be configured to receive any kind of digital data input and to generate any kind of score or classification output based on the input.

For example, if the inputs to the neural network 110 are images or features that have been extracted from images, the output generated by the neural network 110 for a given image may be scores for each of a set of object categories, with each score representing an estimated likelihood that the image contains an image of an object belonging to the category.

As another example, if the inputs to the neural network 110 are Internet resources (e.g., web pages), documents, or portions of documents or features extracted from Internet resources, documents, or portions of documents, the output generated by the neural network 110 for a given Internet resource, document, or portion of a document may be a score for each of a set of topics, with each score representing an estimated likelihood that the Internet resource, document, or document portion is about the topic.

As another example, if the inputs to the neural network 110 are features of an impression context for a particular advertisement, the output generated by the neural network 110 may be a score that represents an estimated likelihood that the particular advertisement will be clicked on.

As another example, if the inputs to the neural network 110 are features of a personalized recommendation for a user, e.g., features characterizing the context for the recommendation, e.g., features characterizing previous actions taken by the user, the output generated by the neural network 110 may be a score for each of a set of content items, with each score representing an estimated likelihood that the user will respond favorably to being recommended the content item.

As another example, if the input to the neural network 110 is a sequence of text in one language, the output generated by the neural network 110 may be a score for each of a set of pieces of text in another language, with each score representing an estimated likelihood that the piece of text in the other language is a proper translation of the input text into the other language.

As another example, if the input to the neural network 110 is a sequence representing a spoken utterance, the output generated by the neural network 110 may be a score for each of a set of pieces of text, each score representing an estimated likelihood that the piece of text is the correct transcript for the utterance.

The training data in the training data repository 120 includes multiple training inputs. Generally, each training input is an input of the type that the neural network 110 is configured to receive. The training data repository 120 also includes, for each training input, a respective target output, i.e., the output that should be generated by the neural network 110 by processing the training input.

Generally, the neural network training system 100 trains the neural network 110 on the training items in the training data repository 120 and on adversarial perturbations of the training items.

In particular, the neural network training system 100 includes an adversarial perturbation engine 130 that receives a training input from the training data repository 120 and generates an adversarial perturbation of the training input, e.g., adversarial perturbation 132 of a training input 122 from the training input 122.

Generally, an adversarial perturbation of a given training input is an input that is slightly different from the given training input. In particular, in some cases, the difference between each entry of the adversarial perturbation and the corresponding entry of the training input is small enough that the difference would be discarded by a sensor or data storage apparatus associated with the machine learning task that the neural network 110 is configured to perform. For example, digital images often use only 8 bits per pixel so they discard all information below 1/255 of the dynamic range of image color values. Thus, an image having color values that each differ by less than 1/255 of the dynamic range from a corresponding color value in a training image would be an adversarial perturbation of the training image.

Generating an adversarial perturbation of a training input is described in more detail below with reference to FIGS. 2 and 3.

The neural network training system 100 processes the training input using the neural network 110 in accordance with current values of the parameters of the neural network 110 to generate a neural network output for the training input, e.g., a neural network output 124 for the training input 122, and processes the adversarial perturbation of the training input using the neural network 110 in accordance with the current values of the parameters of the neural network 110 to generate a neural network output for the adversarial perturbation, e.g., a neural network output 134 for the adversarial perturbation 132.

A training subsystem 150 in the neural network training system 100 trains the neural network 110 using the target output for the training input, the neural network output for the training input, and the neural network output for the adversarial perturbation of the training input to adjust the current values of the parameters of the neural network 110. Training the neural network using this data is described in more detail below with reference to FIGS. 2 and 3.

In some implementations, once the neural network 110 has been trained to determine the trained values of the parameters, the neural network training system 100 stores the trained values of the parameters of the neural network 110 for use in instantiating a trained neural network or provides the trained values of the parameters to another system for use in instantiating a trained neural network.

Figure 2:
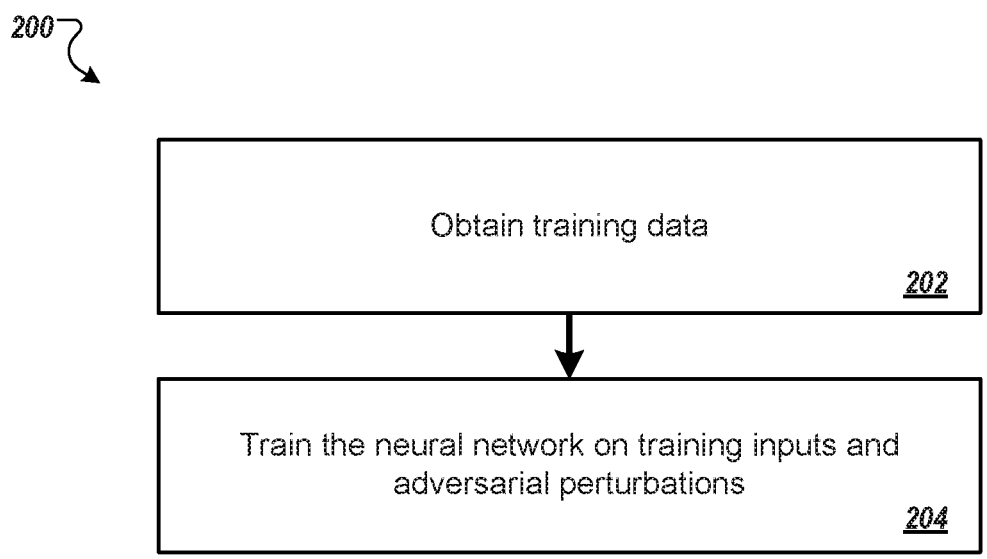
FIG. 2 is a flow diagram of an example process for training a neural network using adversarial perturbations.

FIG. 2 is a flow diagram of an example process 200 for training a neural network using adversarial perturbations. For convenience, the process 200 will be described as being performed by a system of one or more computers located in one or more locations. For example, a neural network training system, e.g., the neural network training system 100 of FIG. 1, appropriately programmed, can perform the process 200.

The system obtains training data for the neural network, e.g., from the training data repository 120 of FIG. 1 (step 202). The training data includes multiple training inputs and, for each of the multiple training inputs, a respective target neural network output.

The system trains the neural network on each of the multiple training inputs and, for each of the training inputs, an adversarial perturbation of the training input to determine trained values of the parameters of the neural network (step 204).

The system trains the neural network by optimizing a specified objective function, i.e., as specified by a system designer or other user of the system, using a neural network training procedure. The objective function can be any appropriate machine learning objective function, e.g., a cross-entropy loss function or a mean-squared loss function, but, for a given neural network input, generally takes as input a neural network output generated by the neural network for the neural network input and a target output for the neural network input.

However, rather than directly optimize the specified objective function, to improve the effectiveness of the training procedure and to improve the performance of the neural network once trained, the system instead uses the neural network training procedure to optimize an adversarial objective function. The value of the adversarial objective function for a given training input is a combination of (i) the value of the specified objective function taking as input the neural network output for the training input and the target output for the training input and (ii) the value of the specified objective function taking as input the neural network output for the adversarial perturbation of the training input and the target output for the training input.

For example, the adversarial objective function $J'(\theta, x, y)$ may satisfy:

$$J'(\theta,x,y)=\alpha J(\theta,x,y)+(1-\alpha)J(\theta,\hat{x},y),$$

where $\theta$ are the current values of the parameters of the neural network as of the processing of the training input x, y is the target output for the training input x, $\alpha$ is a predetermined constant value between 0 and 1 exclusive, $\hat{x}$ is the adversarial perturbation of the training input x, $J(\theta, x, y)$ is the specified objective function taking as input the neural network output for the training input and the target output y for the training input x, and $J(\theta, \hat{x}, y)$ is the specified objective function taking as input the neural network output for the adversarial perturbation $\hat{x}$ of the training input x and the target output y for the training input x.

The neural network training procedure may be, for example, a conventional stochastic gradient descent with backpropagation training procedure.

Figure 3:
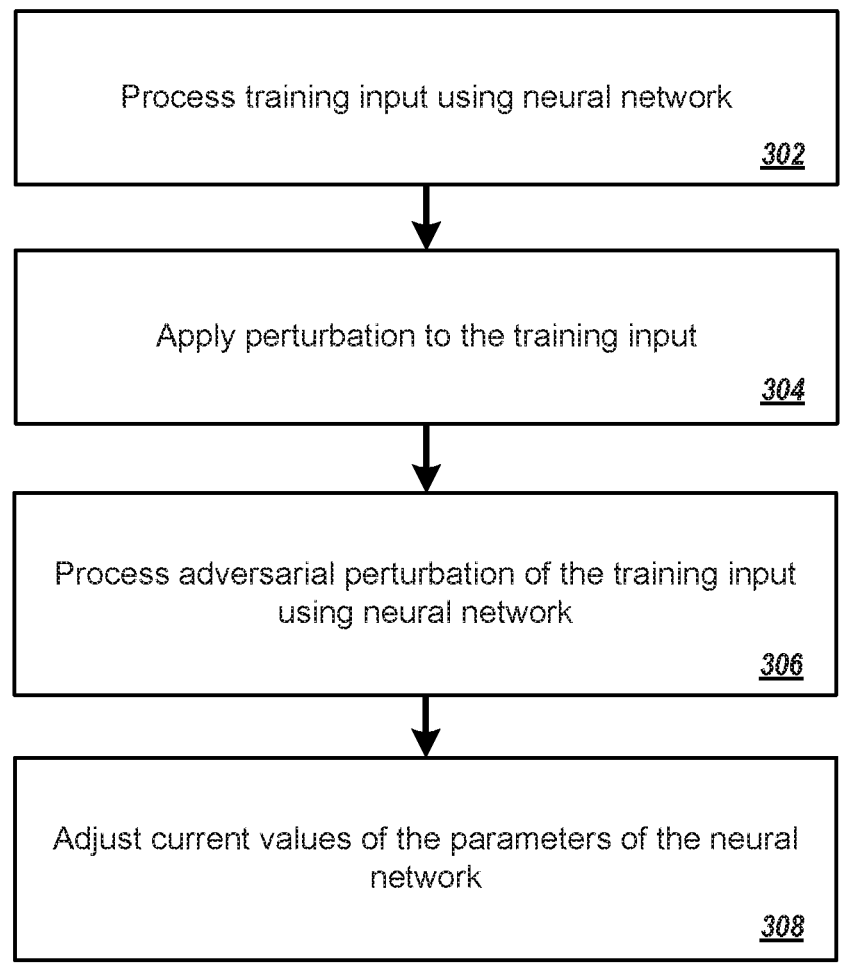
FIG. 3 is a flow diagram of an example process for training a neural network on a training item and an adversarial perturbation of the training item.

FIG. 3 is a flow diagram of an example process 300 for training a neural network on a training item and an adversarial perturbation of the training item. For convenience, the process 300 will be described as being performed by a system of one or more computers located in one or more locations. For example, a neural network training system, e.g., the neural network training system 100 of FIG. 1, appropriately programmed, can perform the process 300.

The system processes the training input using the neural network in accordance with current values of the parameters of the neural network to generate a neural network output for the training input (step 302).

The system applies a perturbation to the training input to generate an adversarial perturbation of the training input (step 304). As described above, the adversarial perturbation is an input that is slightly different from the training input.

In some cases, to generate the adversarial perturbation, the system modifies one or of the entries of the training input so that the modified entry and the original entry differ by less than a threshold value, where two values differing by less than the threshold value are treated as the same value by a predetermined sensor or data storage apparatus. For example, the system can add or subtract a value that is less than the threshold value to each of the one or more entries.

In some implementations, the system determines a gradient of the specified objective function with respect to the training input, e.g., using backpropagation, and modifies the training input using the gradient of the specified objective function to determine the adversarial perturbation of the training input.

For example, the adversarial perturbation $\hat{x}$ of the training input x may satisfy:

$$\hat{x}=x+\epsilon \text{sign}(\nabla_x(J)),$$

where x is the training input, $\nabla_x(J))$ is the gradient of the specified objective function computed with respect to the training input x, $\epsilon$ is a predetermined constant value, and sign is a function that receives a vector of inputs and generates a vector of outputs such that, for each value in the vector of outputs, the value is a predetermined positive number, e.g., one, if the corresponding value in the vector of inputs is positive, the value is zero if the corresponding value in the vector of inputs is zero, and the value is a predetermined negative number, e.g., negative one, if the corresponding value in the vector of inputs is negative. In this example, $\epsilon$ is a value that is small enough to be discarded by a sensor or data storage apparatus, e.g., due to the limited precision of the sensor or data storage apparatus.

The system processes the adversarial perturbation of the training input using the neural network in accordance with the current values of the parameters of the neural network to generate a neural network output for the adversarial perturbation (step 306).

The system adjusts the current values of the parameters of the neural network using the neural network output for the training input and the neural network output for the adversarial perturbation (308).

In particular, the system performs an iteration of the neural network training procedure to determine an update for the current values of the parameters of the neural network by optimizing the adversarial objective function. In some cases, the system processes a batch of multiple training inputs while keeping the current values of the parameters fixed and, once a parameter value update has been determined for each training example in the batch, applies each of the parameter value updates to the current values to generate updated values of the parameters. In some other cases, the system updates the values of the parameters after each training input has been processed.

The system performs the process 300 for multiple different training inputs to determine trained values of the parameters of the neural network from initial values of the parameters.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory program carrier for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them. The computer storage medium is not, however, a propagated signal.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method of training a neural network to determine trained values of parameters of the neural network by optimizing a specified objective function that takes as input a neural network output generated by the neural network for a neural network input and a target output for the neural network input, the method comprising:
obtaining a plurality of training inputs and, for each of the plurality of training inputs, a respective target output for the training input; and
training the neural network on each of the plurality of training inputs, comprising, for each of the plurality of training inputs:
processing the training input using the neural network to determine a neural network output for the training input in accordance with current values of the parameters of the neural network;
generating an adversarial perturbation of the training input comprising:
determining a gradient of the specified objective function with respect to the training input; and
modifying the training input using the determined gradient of the specified objective function by adding a modification to the training input, wherein the modification is equal to:

$\epsilon \text{sign}(\nabla_x(J))$, where $\nabla_x(J)$ is the gradient of the specified objective function with respect to a training input x, $\epsilon$ is a predetermined constant value, and sign is a function that receives a vector of inputs and generates a vector of outputs such that, for each value in the vector of outputs, the value is a predetermined positive number if a corresponding value in the vector of inputs is positive, the value is zero if the corresponding value in the vector of inputs is zero, and the value is a predetermined negative number if the corresponding value in the vector of inputs is negative;
processing the adversarial perturbation of the training input using the neural network to determine a neural network output for the adversarial perturbation of the training input in accordance with the current values of the parameters of the neural network; and
adjusting the current values of the parameters of the neural network by performing an iteration of a neural network training procedure to optimize an adversarial objective function, wherein the adversarial objective function includes the specified objective function taking as input the neural network output for the adversarial perturbation of the training input and the target output for the training input.

2. The method of claim 1, wherein the adversarial objective function is a combination of:
(i) the specified objective function taking as input the neural network output for the training input and the target output for the training input; and
(ii) the specified objective function taking as input the neural network output for the adversarial perturbation of the training input and the target output for the training input.

3. The method of claim 1, wherein $\epsilon$ is a value that is smaller than a threshold that is based on a precision of a sensor or data storage apparatus.

4. The method of claim 1, wherein each entry of the adversarial perturbation of the training input differs from a corresponding value in the training input by less than a threshold value, and wherein two values differing by less than the threshold value are treated as the same value by a particular sensor or a particular data storage apparatus.

5. The method of claim 1, wherein the adversarial objective function J'(θ, x, y) satisfies:

$J'(\theta,x,y)=\alpha J(\theta,x,y)+(1-\alpha)J(\theta,\hat{x},y)$, where θ are the current values of the parameters of the neural network, x is the training input, y is the target output for the training input x, α is a predetermined constant value, $\hat{x}$ is the adversarial perturbation of the training input x, J(θ, x, y) is the specified objective function taking as input the neural network output for the training input and the target output y for the training input x, and J(θ, $\hat{x}$, y) is the specified objective function taking as input the neural network output for the adversarial perturbation $\hat{x}$ of the training input x and the target output y for the training input x.

6. The method of claim 1, wherein performing an iteration of a neural network training procedure to optimize an adversarial objective function comprises performing an iteration of a gradient descent training procedure to adjust the current values of the parameters of the neural network.

7. A system comprising one or more computers and one or more storage devices storing instructions that when executed by one or more computers cause the one or more computers to perform operations for training a neural network to determine trained values of parameters of the neural network by optimizing a specified objective function that takes as input a neural network output generated by the neural network for a neural network input and a target output for the neural network input, the operations comprising:
obtaining a plurality of training inputs and, for each of the plurality of training inputs, a respective target output for the training input; and
training the neural network on each of the plurality of training inputs, comprising, for each of the plurality of training inputs:
processing the training input using the neural network to determine a neural network output for the training input in accordance with current values of the parameters of the neural network;
generating an adversarial perturbation of the training input comprising:
determining a gradient of the specified objective function with respect to the training input; and
modifying the training input using the determined gradient of the specified objective function by adding a modification to the training input, wherein the modification is equal to:

$\epsilon \text{sign}(\nabla_x(J))$, where $\nabla_x(J)$ is the gradient of the specified objective function with respect to a training input x, $\epsilon$ is a predetermined constant value, and sign is a function that receives a vector of inputs and generates a vector of outputs such that, for each value in the vector of outputs, the value is a predetermined positive number if a corresponding value in the vector of inputs is positive, the value is zero if the corresponding value in the vector of inputs is zero, and the value is a predetermined negative number if the corresponding value in the vector of inputs is negative;
processing the adversarial perturbation of the training input using the neural network to determine a neural network output for the adversarial perturbation of the training input in accordance with the current values of the parameters of the neural network; and adjusting the current values of the parameters of the neural network by performing an iteration of a neural network training procedure to optimize an adversarial objective function, wherein the adversarial objective function includes the specified objective function taking as input the neural network output for the adversarial perturbation of the training input and the target output for the training input.

8. The system of claim 7, wherein the adversarial objective function is a combination of:
(i) the specified objective function taking as input the neural network output for the training input and the target output for the training input; and
(ii) the specified objective function taking as input the neural network output for the adversarial perturbation of the training input and the target output for the training input.

9. The system of claim 7, wherein $\epsilon$ is a value that is smaller than a threshold that is based on a precision of a sensor or data storage apparatus.

10. The system of claim 7, wherein each entry of the adversarial perturbation of the training input differs from a corresponding value in the training input by less than a threshold value, and wherein two values differing by less than the threshold value are treated as the same value by a particular sensor or a particular data storage apparatus.

11. The system of claim 7, wherein the adversarial objective function $J'(\theta, x, y)$ satisfies:

$$J'(\theta,x,y)=\alpha J(\theta,x,y)+(1-\alpha)J(\theta,\hat{x},y),$$

where $\theta$ are the current values of the parameters of the neural network, x is the training input, y is the target output for the training input x, $\alpha$ is a predetermined constant value, $\hat{x}$ is the adversarial perturbation of the training input x, $J(\theta, x, y)$ is the specified objective function taking as input the neural network output for the training input and the target output y for the training input x, and $J(\theta, \hat{x}, y)$ is the specified objective function taking as input the neural network output for the adversarial perturbation $\hat{x}$ of the training input x and the target output y for the training input x.

12. The system of claim 7, wherein performing an iteration of a neural network training procedure to optimize an adversarial objective function comprises performing an iteration of a gradient descent training procedure to adjust the current values of the parameters of the neural network.

13. One or more non-transitory computer storage media encoded with instructions that, when executed by one or more computers, cause the one or more computers to perform operations for training a neural network to determine trained values of parameters of the neural network by optimizing a specified objective function that takes as input a neural network output generated by the neural network for a neural network input and a target output for the neural network input, the operations comprising:

obtaining a plurality of training inputs and, for each of the plurality of training inputs, a respective target output for the training input; and training the neural network on each of the plurality of training inputs, comprising, for each of the plurality of training inputs:

processing the training input using the neural network to determine a neural network output for the training input in accordance with current values of the parameters of the neural network;

generating an adversarial perturbation of the training input comprising:
determining a gradient of the specified objective function with respect to the training input; and
modifying the training input using the determined gradient of the specified objective function by adding a modification to the training input, wherein the modification is equal to:

$$\epsilon\text{sign}(\nabla_x(J)),$$

where $\nabla_x(J)$ is the gradient of the specified objective function with respect to a training input x, $\epsilon$ is a predetermined constant value, and sign is a function that receives a vector of inputs and generates a vector of outputs such that, for each value in the vector of outputs, the value is a predetermined positive number if a corresponding value in the vector of inputs is positive, the value is zero if the corresponding value in the vector of inputs is zero, and the value is a predetermined negative number if the corresponding value in the vector of inputs is negative;

processing the adversarial perturbation of the training input using the neural network to determine a neural network output for the adversarial perturbation of the training input in accordance with the current values of the parameters of the neural network; and adjusting the current values of the parameters of the neural network by performing an iteration of a neural network training procedure to optimize an adversarial objective function, wherein the adversarial objective function includes the specified objective function taking as input the neural network output for the adversarial perturbation of the training input and the target output for the training input.

14. The computer storage media of claim 13, wherein the adversarial objective function is a combination of:
(i) the specified objective function taking as input the neural network output for the training input and the target output for the training input; and
(ii) the specified objective function taking as input the neural network output for the adversarial perturbation of the training input and the target output for the training input.

15. The computer storage media of claim 13, wherein $\epsilon$ is a value that is smaller than a threshold that is based on a precision of a sensor or data storage apparatus.

16. The computer storage media of claim 13, wherein each entry of the adversarial perturbation of the training input differs from a corresponding value in the training input by less than a threshold value, and wherein two values differing by less than the threshold value are treated as the same value by a particular sensor or a particular data storage apparatus.

17. The computer storage media of claim 13, wherein the adversarial objective function $J'(\theta, x, y)$ satisfies:

$$J'(\theta,x,y)=\alpha J(\theta,x,y)+(1-\alpha)J(\theta,\hat{x},y),$$

where $\theta$ are the current values of the parameters of the neural network, x is the training input, y is the target output for the training input x, $\alpha$ is a predetermined constant value, $\hat{x}$ is the adversarial perturbation of the training input x, $J(\theta, x, y)$ is the specified objective function taking as input the neural network output for the training input and the target output y for the training input x, and $J(\theta, \hat{x}, y)$ is the specified objective function taking as input the neural network output for the adversarial perturbation $\hat{x}$ of the training input x and the target output y for the training input x.

18. The computer storage media of claim 13, wherein performing an iteration of a neural network training procedure to optimize an adversarial objective function comprises performing an iteration of a gradient descent training procedure to adjust the current values of the parameters of the neural network.

* * * * *